(12) United States Patent
Bourgoyne

(10) Patent No.: US 10,834,457 B1
(45) Date of Patent: Nov. 10, 2020

(54) CLIENT-SIDE WATERMARKING OF VIDEO CONTENT

(71) Applicant: Amazon Technologies, Inc., Seattle, WA (US)

(72) Inventor: David Wayne Bourgoyne, Fall City, WA (US)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 15/782,605

(22) Filed: Oct. 12, 2017

(51) Int. Cl.
*H04L 29/06* (2006.01)
*H04N 21/44* (2011.01)
*H04N 19/467* (2014.01)
*H04N 21/8358* (2011.01)

(52) U.S. Cl.
CPC ..... *H04N 21/44008* (2013.01); *H04N 19/467* (2014.11); *H04N 21/8358* (2013.01)

(58) Field of Classification Search
CPC .......... H04N 21/44008; H04N 19/467; H04N 21/8358
See application file for complete search history.

(56) References Cited

U.S. PATENT DOCUMENTS

| | | | | |
|---|---|---|---|---|
| 2010/0077463 | A1* | 3/2010 | Rickelton-Abdi | G06F 21/10 726/5 |
| 2010/0162410 | A1* | 6/2010 | Chudy | G06F 21/10 726/27 |
| 2010/0215342 | A1* | 8/2010 | Lee | H04N 5/913 386/241 |
| 2013/0061045 | A1* | 3/2013 | Kiefer | H04L 9/0819 713/160 |
| 2013/0066623 | A1* | 3/2013 | Chou | G06F 17/289 704/2 |
| 2016/0071229 | A1* | 3/2016 | Beaubien | G06T 1/0028 382/100 |
| 2016/0165297 | A1* | 6/2016 | Jamal-Syed | H04N 21/42203 386/201 |
| 2016/0182952 | A1* | 6/2016 | Wu | H04N 21/4627 725/31 |
| 2017/0329942 | A1* | 11/2017 | Choi | H04L 9/088 |
| 2019/0012439 | A1* | 1/2019 | Munro | G06Q 30/02 |

* cited by examiner

*Primary Examiner* — Shewaye Gelagay
*Assistant Examiner* — Michael M Lee
(74) *Attorney, Agent, or Firm* — Weaver Austin Villeneuve & Sampson LLP

(57) ABSTRACT

Techniques are described for associating identifiers (e.g., digital watermarks) with video content in a way that enables identification of the source of pirated content with specificity as granular as an individual user account. A compositors operating in the DRM trust zone of a client device introduces the identifier by compositing overlay information with decoded video frames. The identifier may then be recovered by comparing target content to the source content to extract the overlay information.

21 Claims, 5 Drawing Sheets

CLIENT-SIDE WATERMARKING OF VIDEO CONTENT

BACKGROUND

The unauthorized use and distribution of content continues to be a significant issue facing content providers. While video is generally delivered encrypted, pirates have developed a variety of techniques to extract decrypted video. One approach records the video once it's been decrypted using a recording device that emulates a trusted device implementing the High-bandwidth Digital Content Protection (HDCP) connection protocol. For example, such a device might appear to be a High-Definition Multimedia Interface (HDMI) device such as an HD television to the player rendering the video. Another approach involves recording the video with a camera as it is played back on a screen. Screen scraping is another approach used in the context of video played back in a web browser.

Digital watermarking of video before encoding can be used to at least partially address these approaches to piracy in that, at least in theory, the embedded watermarks are retained in the pirated content. The watermarks can then be recovered to identify the source of the pirated content. However, such an approach is only effective at identifying sources of content at a very coarse level of granularity such as, for example, content distribution services. This is due to the fact that every content title has dozens of variants representing different streaming formats (e.g., DASH, HLS, Smooth Streaming) and different resolutions and bit rates within each format. Identifying individual accounts could be done by watermarking each variant of each title for each account at the back end. However, given the number of titles, the number of variants of each, and the number of accounts, it will be understood that this is not a scalable approach.

One approach to back-end watermarking involves watermarking each variant of each title with two unique watermarks which are then stitched together during playback in an attempt to uniquely identify an end user account. However, not only does this approach double the amount of content storage required, it is susceptible to defeat by entities that collude to mix downloaded content in a way that results in false positives and negatives.

DETAILED DESCRIPTION

This disclosure describes techniques for associating information (e.g., digital watermarks) with video content in a way that enables identification of the source of pirated content with specificity as granular as an individual user account. Rather than attempting to insert such information at the back end (e.g., prior to encoding), the techniques enabled by the present disclosure introduce the identifiers on the client side. In particular, these techniques use compositors operating in the DRM trust zones of the clients to introduce the identifiers by compositing overlay information with the decoded video frames; preferably, but not necessarily, in a way that is not readily detectable to the human eye. The identifiers may then be recovered by comparing target content to the corresponding source content, filtering the target content, or a combination of both, to extract the overlay information. An example will be instructive.

Figure 1:
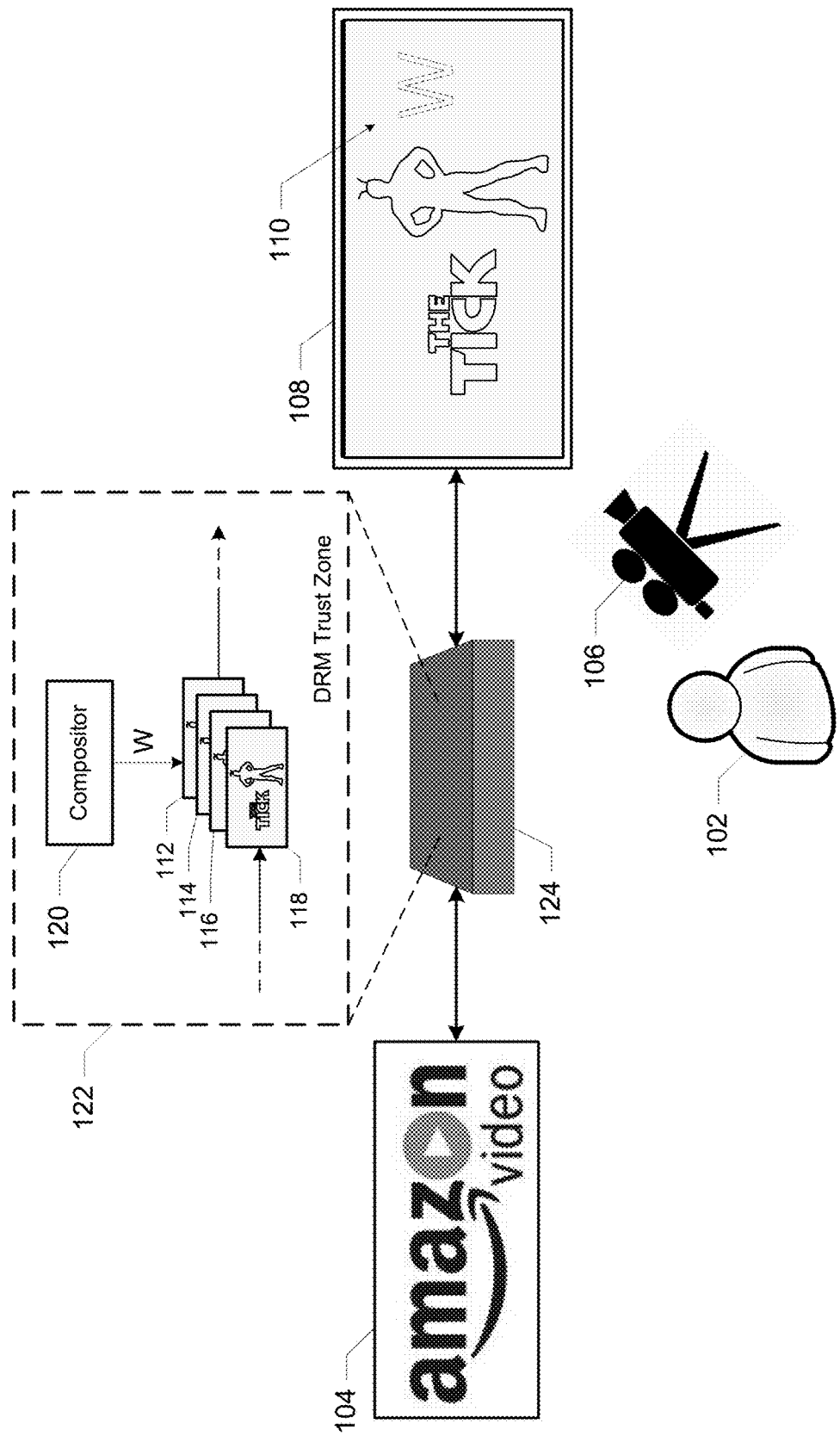
FIG. 1 illustrates an example of the operation of a particular implementation.

Referring to FIG. 1, assume that a user 102 of the Amazon Video service 104 requests a download of the entire first season of Amazon's new series "The Tick" for the purpose of unauthorized distribution of the content. Using an HD camera 106 focused on his 4K UHD flat screen television 108, user 102 records the episodes as they are displayed. However, unbeknownst to user 102, a digital watermark 110 is overlaid on at least some of the decoded video frames (e.g., 112-118) by compositor 120 operating in DRM trust zone 122 of user 102's Fire TV Streaming Media Player 124. Watermark 110 is preferably not visible to the human eye (as represented by the dashed lines), and might encode, for example, the Amazon Prime account number of user 102 or some other suitable identifier. When user 102 later posts the unauthorized recordings on YouTube, the watermark can be recovered by comparison with the original source content, filtering of the target content, or a combination of both, and user 102's account can be identified as the source of the unauthorized content.

Figure 2:
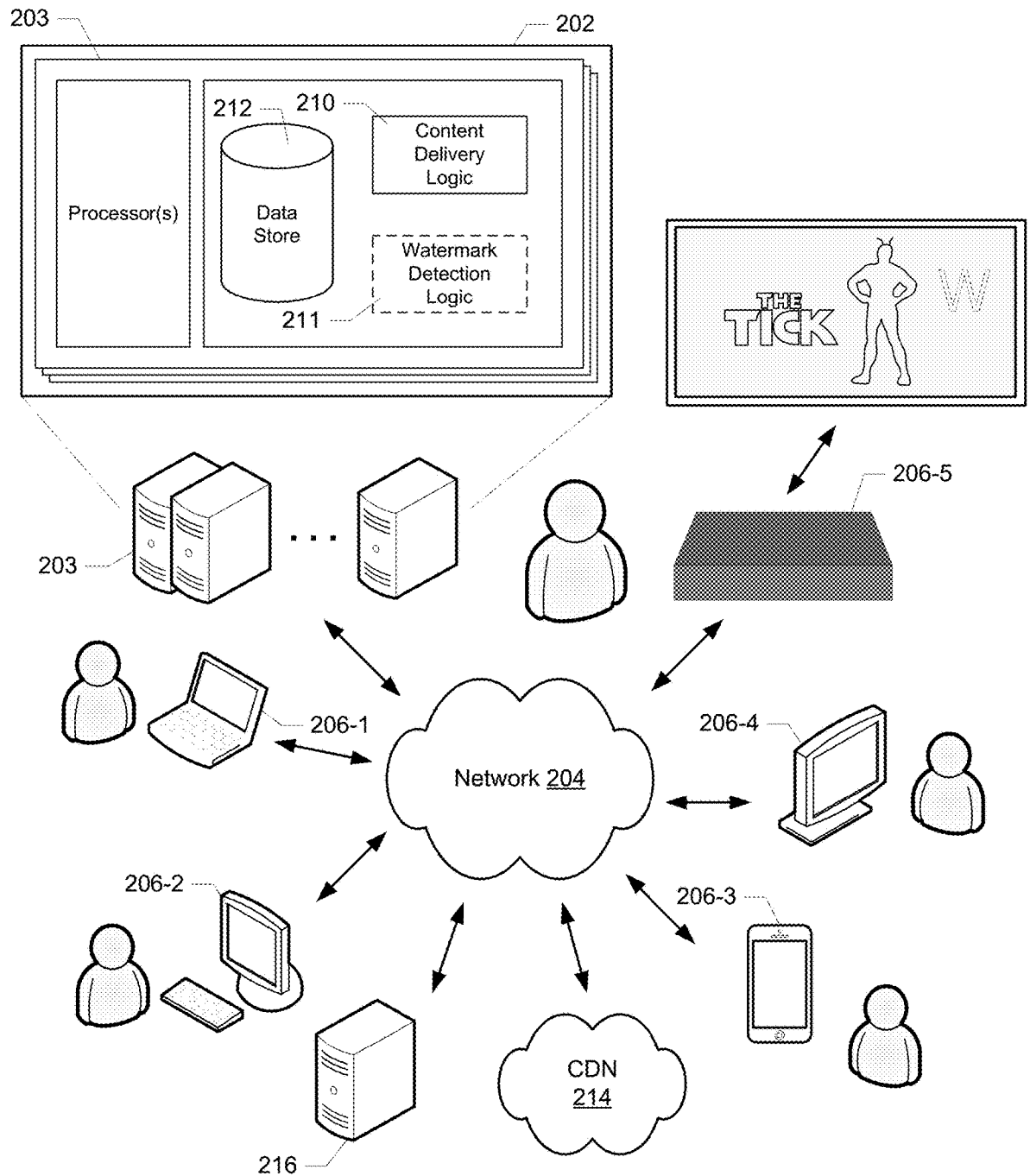
FIG. 2 is an example of a computing environment in which various implementations may be practiced.

FIG. 2 illustrates an example of a computing environment in which a video content service 202 (e.g., Amazon Video 104) provides video content via network 204 to a variety of client devices (206-1 through 206-5) in accordance with the techniques described herein. As should be appreciated, the video content may be downloadable content, streaming content, video on demand, live/broadcast video, etc. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides the content to client devices. However, it will be understood that content service 202 may provide access to content in conjunction with one or more content delivery networks (e.g., CDN 214) that may or may not be independent of content service 202. In addition, the source of the content may or may not be independent of content service 202 (e.g., as represented by content provider server 216). The range of variations known to those of skill in the art are contemplated to be within the scope of this disclosure.

The various implementations enabled by the present disclosure contemplate logic resident on the client devices consuming video content from content service 202; such logic being configured to introduce digital watermarks as described herein. The logic, at least some of which operates in the DRM trust zone of the client device, might be part of an existing algorithm or module on the client device or implemented to work in conjunction with such an algorithm or module.

It should also be noted that implementations are contemplated in which, in addition to content delivery logic 210 (which facilitates various aspects of content delivery to client devices 206), content service 202 may include logic that facilitates at least some aspects of digital watermark detection as described herein (e.g., as represented by watermark detection logic 211). For example, such logic might be configured to compare target video content to source video content, filter the target content, or both, to detect digital watermarks. Such logic might also be configured to prepare the source content for comparison to the target content, e.g., by making spatial and/or temporal adjustments to the original source content, and/or adjusting the resolution of the original source content to more closely match that of the target content. As will be appreciated and as indicated by the dashed outline, watermark detection logic 211 need not be closely coupled with the delivery of content as its operation typically occurs remotely in time relative to content delivery, e.g., after the distribution or posting of unauthorized content has been detected.

In addition to providing access to video content, content service 202 may also include a variety of information related to the video content (e.g., other associated metadata and manifests in data store 212 to which service 202 provides access. Alternatively, such information about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
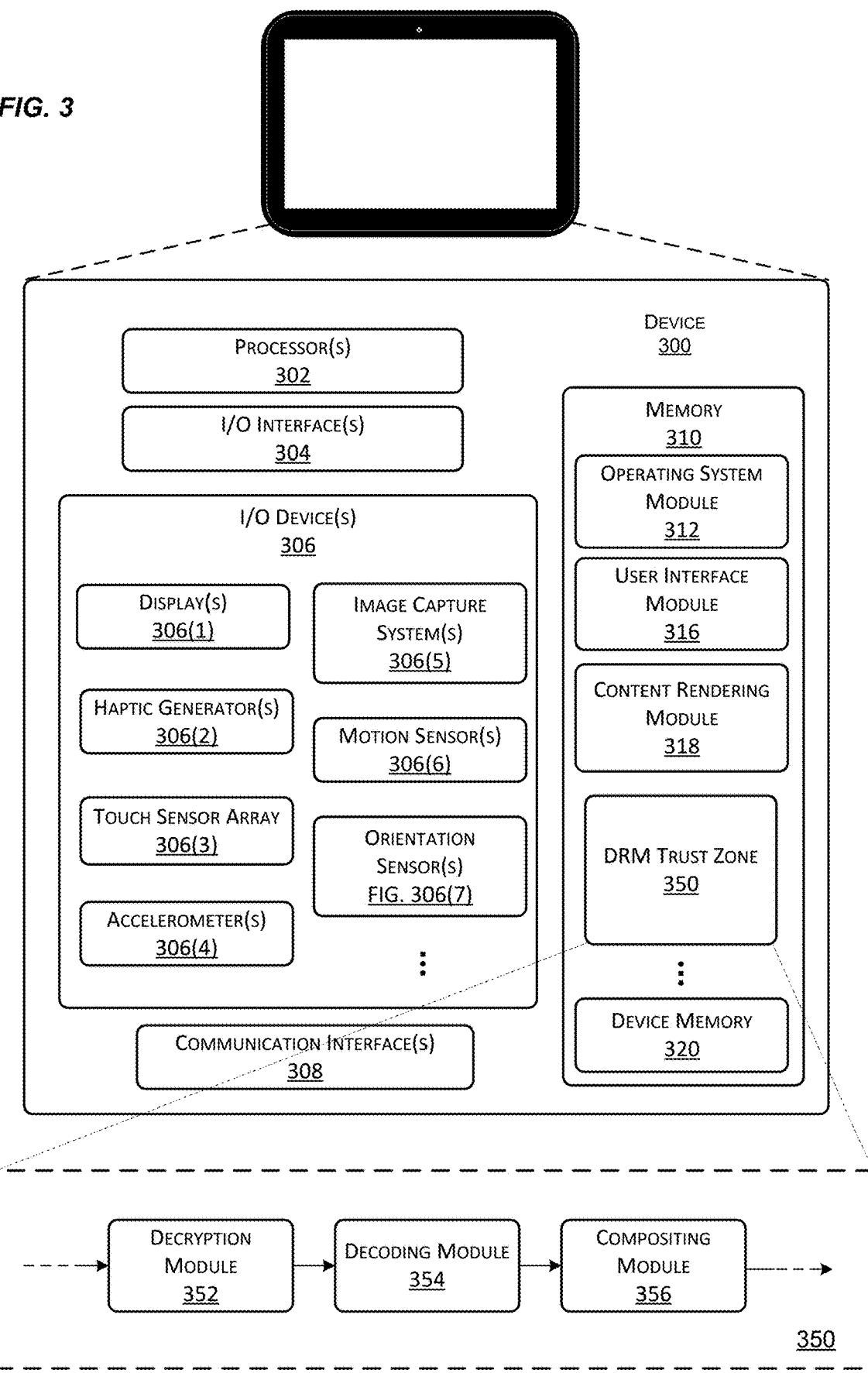
FIG. 3 is simplified block diagram of a client device in which various implementations may be practiced.

A block diagram of an example of a client device 300 suitable for use with various implementations is shown in FIG. 3. As mentioned above with reference to FIG. 1, a client device 300 might be, for example, a Fire TV Streaming Media Player (e.g., 124). However, it should be understood that device 300 may include a wide variety of device types and may implement the logic for introducing digital watermarks in hardware, software, and/or firmware. Returning to the example of FIG. 3, device 300 is depicted as a tablet device and includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

At least a portion of the logic used to introduce digital watermarks as described herein is included in a secure processing environment operating on the client device and may be implemented in a variety of ways, e.g., in hardware, software, and/or firmware. For example, this functionality may be implemented using a purpose-built DRM hardware device operating on device 300. Alternatively, this functionality may be implemented as a DRM software module that operates in conjunction with the device's media player or web browser. Whether implemented in hardware, software, and/or firmware, the secure processing environment (represented by 350 in FIG. 3) performs decryption of the encrypted video (e.g., decryption module 352), decoding of the decrypted video (e.g., decoding module 354), and compositing of the decoded video frames with overlays (e.g., compositing module 356), including the introduction of digital watermarks as described herein. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
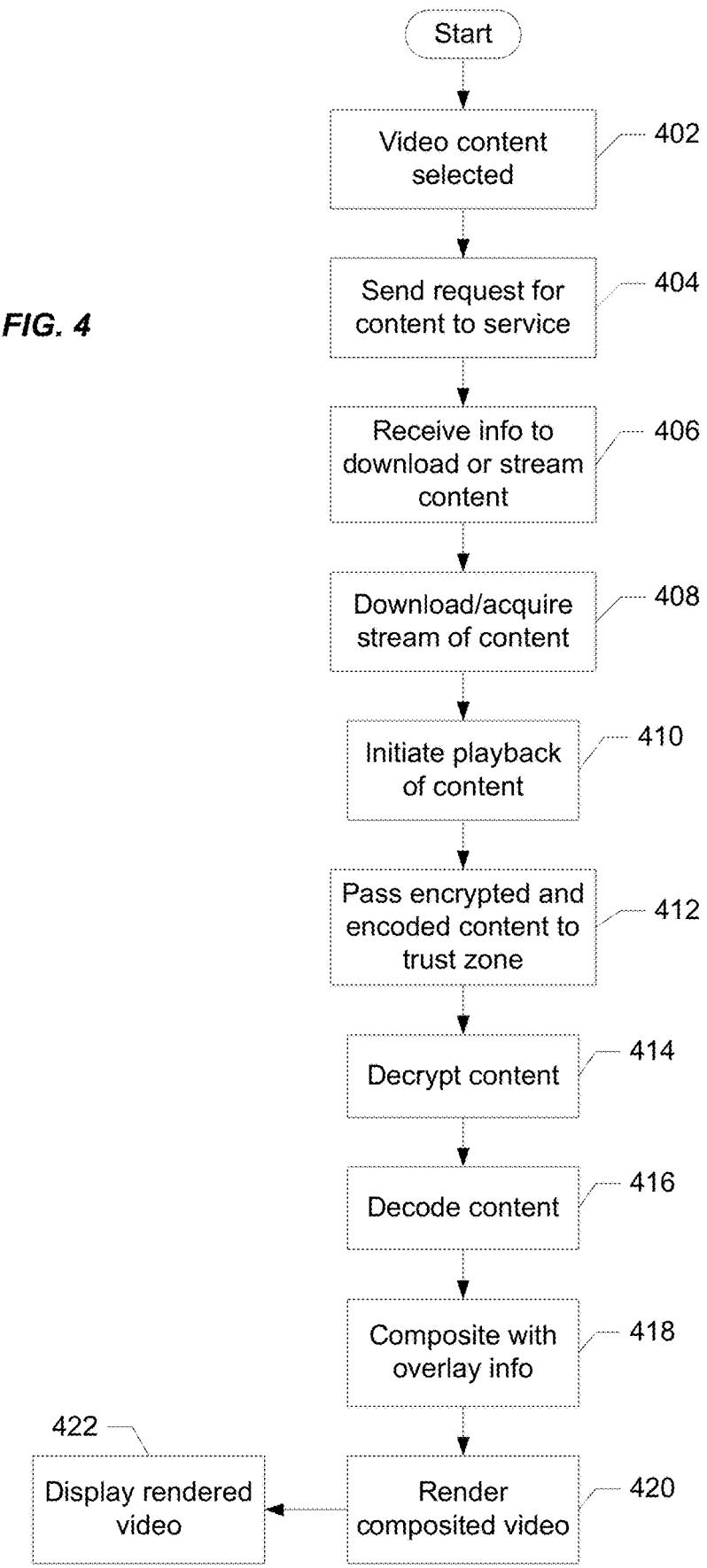
FIG. 4 is a flowchart illustrating operation of a particular class of implementations.

The watermarking of video content by a client device according to a particular implementation is illustrated in the flow chart of FIG. 4. When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Video content is typically delivered encrypted using any of a variety of encryption technologies including, for example, various Advanced Encryption Standard (AES) and Elliptic Curve Cryptography (ECC) encryption techniques. The video content may be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. Alternatively, the video content may be downloaded by the client device using any of a variety of data transfer protocols. The video content may be encoded using any of a variety of including, for example, MPEG-1, MPEG-2, MPEG-4 Part 2, VC-1, H.263, VP8,VP9, Daala, H.264, and H.265 (HEVC). It should be noted that the techniques described herein are compatible with a wide range of content services, media players, DRM systems, encryption technologies, streaming technologies, and codecs, the details of which are known to those of skill in the art. The nature and operation of these technologies will therefore not be described in detail to promote clarity.

Referring now to FIG. 4, when video content is selected in a user interface on a client device (402), a request for the content is sent to the corresponding content service (404). The content service provides the client device with the information the client device needs to download the content or to acquire a stream of the content (406). This may include, for example, DRM licenses, a decryption key, content metadata, and information about where the client can request the fragments of the selected content at various resolutions (e.g., a manifest). The client device then downloads the video content or acquires a stream of the video content using the information received from the content service (408).

When client device begins playback of the downloaded or streaming content (410), the compressed and encrypted video is passed to a secure video processing environment, e.g., a DRM "trust zone," operating on the client device (412). As mentioned above, this might involve, for example, a media player on the client device passing the encrypted video to purpose-built hardware such as hardware provided by, for example, ARM, Intel, Qualcomm, and Texas Instrument, to name a few representative examples. Alternatively, this might involve passing the encrypted video from a media player or browser to a secure processing environment implemented in software on the client device. Examples of DRM processing environments associated with various browsers include Widevine (supported by Chrome, Firefox, and Opera), Primetime (supported by Firefox), PlayReady (supported by Internet Explorer and Edge), and FairPlay (supported by Safari).

In the secure processing environment, the video is decrypted (414), e.g., by decryption module 352, and decoded (416), e.g., by decoding module 354. As mentioned above, the type of encryption and the codec employed are not particular relevant to the techniques enabled by the present disclosure.

The decoded video frames are passed to a compositor for compositing with overlay information (418), e.g., by compositing module 356. As will be discussed, the overlay information may encode a digital watermark in any of a wide variety of ways. This compositing results in a sequence of composited video frames that are then rendered (420), and passed to the display associated with the client device for presentation (422).

According to a particular class of implementations, the overlay information is introduced by compositing the pixel information of the decoded video frames with opacity information encoded in a largely transparent overlay, i.e., a form of spatial-domain watermarking. Effectively, the pixel transparencies of the overlay frame are manipulated in a manner that encodes the overlay information. Such opacity information may be included, for example, in the alpha channel of the red-green-blue (RGB) color space or model, referred to as RGBA (where the "A" represents the alpha channel). According to such an approach, the overlay is composited pixel by pixel with the decoded video frame. If the alpha channel for a given pixel in the overlay has a value corresponding to 0%, that overlay pixel is completely transparent and so only the information of the corresponding pixel of the decoded video frame is preserved in the resulting composited frame. By contrast, any non-zero value in the alpha channel for an overlay pixel results in a pixel in the composited video frame that correspondingly obscures or alters the information of the corresponding pixel of the decoded video frame.

It is desirable in some implementations that the overlay information for the digital watermark not be readily perceptible to the human eye (often referred to as digital steganography). Not only does that make it more difficult for content pirates to detect, alter, remove, or otherwise defeat the digital watermark, it ensures that the quality of the video content being watermarked is not significantly degraded. However, it should be noted that implementations are contemplated in which the overlay information is perceptible to varying degrees. Not only might this serve to make the digital watermark more robust, it might also serve as an explicit reminder to users that the unauthorized copying and distribution of the content is prohibited.

As will be appreciated there may be zero, one, or multiple overlays composited with a given frame of decoded video. For example, in addition to the overlay that includes the information corresponding to the digital watermark, another overlay might include representations of user interface elements that allow a user to navigate back and forth through the video (e.g., pause, play, rewind, fast forward). As is well understood, the introduction of such an overlay is typically programmatically responsive to actions taken by the user such as, for example, pressing a key on a remote control, mousing over a video window on the display, and so on. Such events are passed from the "non-secure" environment of the client device, e.g., from the device browser or media player, to the secure processing environment to precipitate the introduction of such overlays by the compositor.

The overlay that includes the information corresponding to the digital watermark may be provided to the secure processing environment using a similar mechanism as that by which user action events are provided. For example, a video playback application could include logic that encodes the watermark information into a bit plane that is passed to the compositor in the secure processing environment. This overlay information may be integrated with the decoded video frames in a variety of ways. For example, overlay information may be introduced in every frame of the decoded video. Alternatively, overlay information may be introduced in only some subset of the frames. In another example, the entire digital watermark may be introduced each time it is overlaid on a decoded video frame. Alternatively, only some portion of the watermark might be introduced in each of a sequence of frames (which need not be consecutive) such that the complete watermark may be reconstructed using some combination of the information from the sequence of frames. In another example, the overlay information may be integrated at different locations in different frames of the encoded video. A wide variety of other variations will be appreciated from these examples.

The nature of the overlay information from which a digital watermark may be recovered or reconstructed may vary considerably depending on the implementation. In some implementations, the information overlaid on the video frames strikes an appropriate balance between being robust and being unobtrusive. That is, it is desirable that the pattern be sufficiently robust to survive the various transformations that occur when video is captured, due to subsequent transcoding, intentional distortions to defeat watermarking, etc. On the other hand, as mentioned above, it may also be desirable that the pattern not be readily detectable to the human eye so as not to interfere with the user experience.

Suitable variations in the nature of the manner in which a digital watermark is encoded by the overlay information will be apparent to those of skill in the art. For example, the locations and/or degree of opacity of pixels can be the basis for encoding all or some portion of a digital watermark. In some implementations, the overlay information may be configured such that the digital watermark may only be recovered by integrating or combining the overlay information over multiple (potentially many) frames of composited video. For example, the digital watermark might be some kind of a symbol or sequence of symbols representing a user, a user account, a client device, etc. Such information might be encoded using, for example, probabilistic codes such as those developed by Gabor Tardos (Tardos codes). However, any of a variety of suitable techniques for encoding this type of information may be employed. The overlay information in any given frame might represent some portion of the symbol or code (e.g., a random sample) such that, even if perceptible or otherwise detectable, it appears to be random noise. However, by combining contributions over many frames, the original symbol(s) can be recovered.

Figure 5:
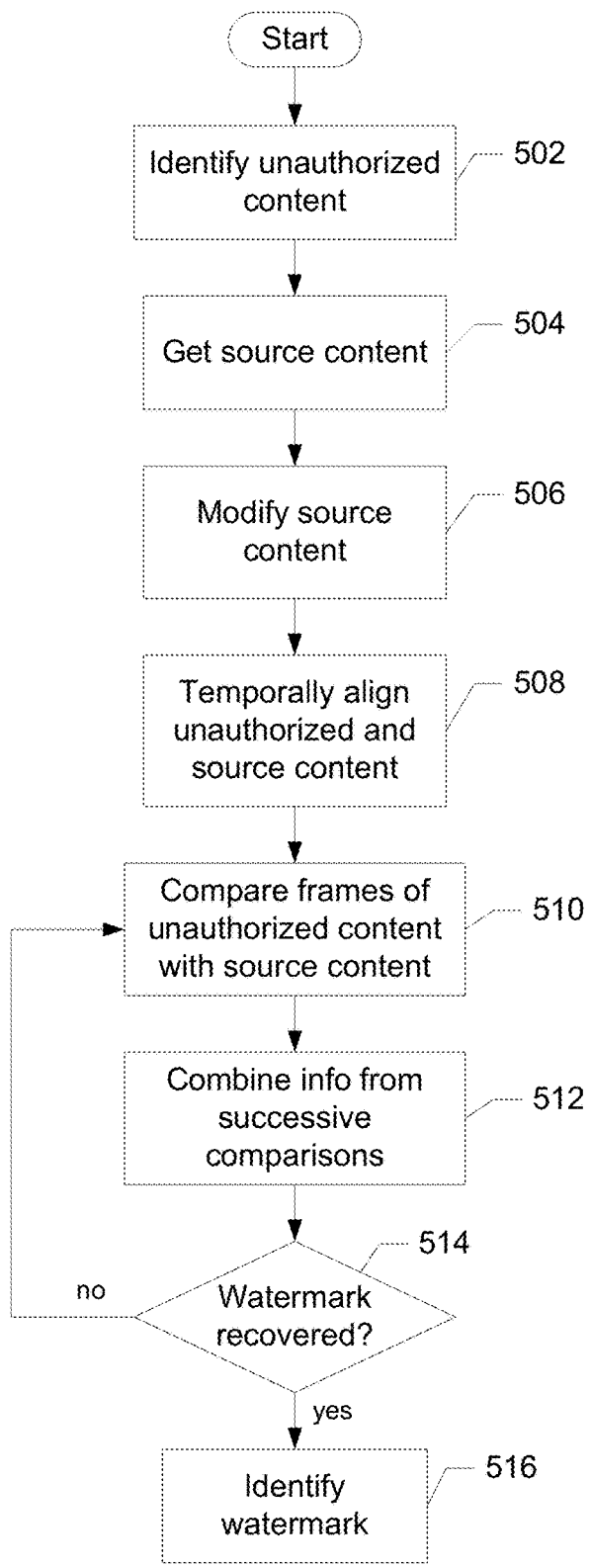
FIG. 5 is a flowchart illustrating operation of another class of implementations.

According to various implementations, the digital watermark is recovered by determining the difference (e.g., by subtraction or other form of comparison) between frames of the watermarked video and corresponding frames of an appropriate version of the original source video that doesn't contain the overlay information. FIG. 5 is a flowchart illustrating recovery or detection of a digital watermark according to a particular implementation.

An unauthorized copy of video content is identified (502), e.g., posted on social media, a video sharing site, retrieved from a node in a peer-to-peer network, etc. A copy of the original source video corresponding to the unauthorized copy is obtained (504). This might be responsive to the identification of the unauthorized video content, or might be done at some earlier or later time. The copy of the source video might be derived from a digital master file, so the source video might need to be modified (506) before comparison to the unauthorized copy. For example, if the digital master is a 4K UHD video it may not be readily comparable to a 1080p HD copy or a 720p SD copy. So, for a given comparison, the source video may need to be scaled to a comparable resolution. Spatial alignment (e.g., by cropping or resizing) might also be required in that the unauthorized video might be cropped or resized relative to the original.

The manner in which the source video should be modified or adapted may be determined based on analysis of the unauthorized content. For example, the resolution of the unauthorized content may be determining the number of pixels represented in one or more frames of the unauthorized content. Spatial alignment and/or resizing might be determined by comparing features in corresponding frames to determine their respective locations relative to the edges of the frame, and the necessary transformation to align them. The frames of the source video may need to be scaled, rotated, or skewed. The accuracy of the aligned images may be computed through techniques such as, for example, root mean square (RMS) error analysis, sum of absolute differences (SAD) analysis, edge analysis, etc.

The source video and the unauthorized video are temporally aligned (508). This alignment is to ensure that the correct frames of the two videos are compared and may involve identifying readily distinguishable points in each video such as, for example, a specific frame(s) of a title sequence or opening credits, obvious scene transitions, black frames, advertisement insertion points, slate frames, etc. Temporal alignment might also involve the combination or removal of frames (e.g., where the source video has a frame rate of 60 fps and the unauthorized video 30 fps).

Once the source video and the unauthorized video are temporally aligned, a frame-by-frame comparison is performed to identify a difference between each pair of frames (510). This may be done, for example, by subtracting one from the other. The difference will include noise (e.g., introduced by any transcodings or transformations) and, for at least some of the frames of the unauthorized video, the overlay information corresponding to the digital watermark. According to some implementations, if the frame rates of the videos don't match (e.g., the source video is 60 fps and the unauthorized video is fps) the comparison may be done using only every other frame of the source video rather than affirmatively removing or combining frames as mentioned above.

The differences obtained by the frame-by-frame comparisons are integrated, summed, or otherwise combined (512) until sufficient information is recovered (514) for the digital watermark to be recognized (516). As mentioned above, the overlay information may be introduced on most or every frame of the composited video. The differences with the source video may then be accumulated over many frames to recover the digital watermark; effectively building up the signal based on the recovered overlay information until the digital watermark emerges from the noise. As will be appreciated, such an approach would be useful for handling signal-to-noise ratio issues and degradation of the overlay information caused by noisy image capture and/or multiple transcodings.

It should also be noted that a digital watermark introduced as described herein may be recovered using filtering techniques to extract the watermark from the target video, and such filtering techniques may be used by themselves or in combination with comparison of the target content to the original content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving encrypted video content with a video playback application operating on a computing device, the computing device having a primary operating system;
providing the encrypted video content to a digital rights management (DRM) processing environment on the computing device, the DRM processing environment including a compositor configured to overlay user interface controls on video content during playback, the video playback application and the primary operating system not having programmatic access to the DRM processing environment;
decrypting the encrypted video content in the DRM processing environment thereby generating unencrypted video content;
decoding the unencrypted video content in the DRM processing environment thereby generating decoded video content;
providing overlay information to the DRM processing environment;
compositing each frame of the decoded video content with a corresponding overlay plane using the overlay information and the compositor in the DRM processing environment thereby generating composited video content, each overlay plane being predominantly transparent and including at least a portion of a digital watermark corresponding to a customer account associated with the video playback application, the digital watermark being encoded in the overlay planes using an alpha channel of a red-green-blue color model; and
after generating the composited video content using the overlay information, rendering the composited video content for presentation on a display associated with the computing device.

2. The method of claim 1, wherein each overlay plane includes (1) the digital watermark in its entirety, (2) less than all of the digital watermark, or (3) a randomly selected portion of the digital watermark.

3. The method of claim 1, wherein the portion of the digital watermark occupies different locations in successive frames of the composited video content.

4. The method of claim 1, wherein the digital watermark is not detectable to the human eye when the composited video content is presented on the display.

5. A computing device, comprising:
memory having instructions stored therein; and
one or more processors configured to execute the instructions to:
facilitate operation of a primary operating system and a video playback application on the computing device;
facilitate operation of a secure digital rights management (DRM) processing environment on the computing device, the secure DRM processing environment including a compositor configured to overlay user interface controls on video content during playback, wherein the primary operating system and the video playback application do not have programmatic access to the secure DRM processing environment;
receive encrypted video content with the video playback application;
provide the encrypted video content from the video playback application to the secure DRM processing environment;
decrypt the encrypted video content using the secure DRM processing environment thereby generating unencrypted video content;
decode the unencrypted video content using the secure DRM processing environment thereby generating decoded video content;
provide overlay information to the secure DRM processing environment;
composite selected frames of the decoded video content with the overlay information using the compositor in the secure DRM processing environment thereby generating composited video content, the composited video content including an identifier corresponding to an entity associated with the computing device; and
after generating the composited video content using the overlay information, render the composited video content for presentation on a display associated with the computing device.

6. The computing device of claim 5, further comprising an integrated circuit configured to implement the secure DRM processing environment.

7. The computing device of claim 5, wherein the one or more processors partition computing resources of the computing device to implement the secure DRM processing environment.

8. The computing device of claim 5, wherein the overlay information composited with each of the selected frames of the decoded video content represents (1) the identifier in its entirety, (2) less than all of the identifier, or (3) a randomly selected portion of the identifier.

9. The computing device of claim 5, wherein the overlay information composited with the selected frames of the decoded video content occupies different locations in different frames of the composited video content.

10. The computing device of claim 5, wherein the selected frames of the decoded video content with which the overlay information is composited include (1) all of the frames of the decoded video content, or (2) fewer than all of the frames of the video content.

11. The computing device of claim 5, wherein the overlay information is not detectable to the human eye when the composited video content is presented on a display.

12. An integrated circuit, comprising logic implemented in hardware and configured to:
  implement a secure hardware digital rights management (DRM) processing environment within a computing device, the secure DRM processing environment including a compositor configured to overlay user interface controls on video content during playback, the computing device including a primary operating system and a video playback application, wherein the logic of the integrated circuit is configured to prevent the primary operating system and the video playback application from having programmatic access to the secure hardware DRM processing environment;
  receive encrypted video content;
  decrypt the encrypted video content in the secure hardware DRM processing environment thereby generating unencrypted video content;
  decode the unencrypted video content in the secure hardware DRM processing environment thereby generating decoded video content;
  provide overlay information to the secure hardware DRM processing environment;
  composite selected frames of the decoded video content with the overlay information using the compositor in the secure hardware DRM processing environment thereby generating composited video content, the composited video content including an identifier corresponding to an entity associated with the computing device; and
  after generating the composited video content using the overlay information, transmit the composited video content for rendering and presentation on a display associated with the computing device.

13. The integrated circuit of claim 12, wherein the overlay information composited with each of the selected frames of the decoded video content represents (1) the identifier in its entirety, (2) less than all of the identifier, or (3) a randomly selected portion of the identifier.

14. The integrated circuit of claim 12, wherein the overlay information composited with the selected frames of the decoded video content occupies different locations in different frames of the composited video content.

15. The integrated circuit of claim 12, wherein the selected frames of the decoded video content with which the overlay information is composited include (1) all of the frames of the decoded video content, or (2) fewer than all of the frames of the video content.

16. The integrated circuit of claim 12, wherein the overlay information is not detectable to the human eye when the composited video content is presented on a display.

17. A computer program product, at least one non-transitory computer readable medium having computer program instructions stored therein, the computer program instructions being configured such that, when executed by one or more processors, the computer program instructions cause the one or more processors to:
  implement a secure digital rights management (DRM) processing environment within a computing device, the secure DRM processing environment including a compositor configured to overlay user interface controls on video content during playback, the computing device facilitating operation of a primary operating system and a video playback application, wherein computer program instructions cause the one or more processors to prevent the primary operating system and the video playback application from having programmatic access to the secure DRM processing environment;
  receive encrypted video content;
  provide the encrypted video content to the secure DRM processing environment;
  decrypt the encrypted video content in the secure DRM processing environment thereby generating unencrypted video content;
  decode the unencrypted video content in the secure DRM processing environment thereby generating decoded video content;
  provide overlay information to the secure DRM processing environment;
  composite selected frames of the decoded video content with overlay information using the compositor in the secure DRM processing environment thereby generating composited video content, the composited video content including an identifier corresponding to an entity associated with the computing device; and
  after generating the composited video content using the overlay information, transmit the composited video content for rendering and presentation on a display associated with the computing device.

18. The computer program product of claim 17, wherein the overlay information composited with each of the selected frames of the decoded video content represents (1) the identifier in its entirety, (2) less than all of the identifier, or (3) a randomly selected portion of the identifier.

19. The computer program product of claim 17, wherein the overlay information composited with the selected frames of the decoded video content occupies different locations in different frames of the composited video content.

20. The computer program product of claim 17, wherein the selected frames of the decoded video content with which the overlay information is composited include (1) all of the frames of the decoded video content, or (2) fewer than all of the frames of the video content.

21. The computer program product of claim 17, wherein the overlay information is not detectable to the human eye when the composited video content is presented on a display.

* * * * *